United States Patent [19]

Uetsuki et al.

[11] Patent Number: 5,444,570
[45] Date of Patent: Aug. 22, 1995

[54] POLARIZING SCREEN

[75] Inventors: Masao Uetsuki; Takashi Tsunematsu, both of Kurashiki, Japan

[73] Assignee: Kuraray Co., Ltd., Kurashiki, Japan

[21] Appl. No.: 311,187

[22] Filed: Sep. 23, 1994

[30] Foreign Application Priority Data

Sep. 24, 1993 [JP] Japan .................................. 5-238171
Dec. 28, 1993 [JP] Japan .................................. 5-350201

[51] Int. Cl.⁶ ............................................. G02B 5/30
[52] U.S. Cl. ..................................... 359/483; 359/486
[58] Field of Search ............... 359/483, 485, 491, 443, 359/454, 452, 486, 465, 493; 358/61, 88

[56] References Cited

U.S. PATENT DOCUMENTS

| | | | |
|---|---|---|---|
| 2,362,573 | 11/1944 | MacNeille | 359/455 |
| 2,380,241 | 7/1945 | Jelley et al. | 359/460 |
| 2,793,361 | 5/1957 | White . | |
| 3,319,519 | 5/1967 | Shelanski . | |
| 4,884,131 | 11/1989 | Chevion et al. | 358/88 |
| 5,086,354 | 2/1992 | Bass et al. | 359/465 |
| 5,148,309 | 9/1992 | Yamada et al. | 359/443 |
| 5,251,065 | 10/1993 | Uetsuki | 359/454 |

FOREIGN PATENT DOCUMENTS 0295913 12/1988 European Pat. Off. .

OTHER PUBLICATIONS

English Abstract of a Japanese Patent #5–197026, Masao Uetsuki, Polarizing Screen and Projector Using the Same, Aug. 6, 1993.
English Abstract of a Japanese Patent #3–287244, Takehisa Natori, Screen for Projector, Dec. 17, 1991.
English Abstract of a Japanese Patent #4–29127, Kazuhiro Tachibana, Transmission Type Screen and Transmission Type Screen Assembly, Jan. 31, 1992.
English Abstract of a Japanese Patent #4–63333, Masaharu Hara, Polarizing Screen for Liquid Crystal Projector, Feb. 28, 1992.

*Primary Examiner*—Loha Ben
*Assistant Examiner*—Steve Kong
*Attorney, Agent, or Firm*—Oblon, Spivak, McClelland, Maier & Neustadt

[57] ABSTRACT

A polarizing screen 20 for presenting images in response to receipt of imagewise rays of light 22 projected from, for example, a video projector. The polarizing screen 20 is made of a woven polarizing fabric 1 which has front and rear surfaces D and E opposite to each other and which is woven in a satin fashion including warps of one of polarizing and non-polarizing threads 12 and 11 and wefts of the other of the polarizing and non-polarizing threads 12 and 11. The front surface D of the woven polarizing fabric 1 has a relatively large portion of the polarizing threads 12 being exposed therefrom and the rear surface E thereof has a relatively large portion of the non-polarizing threads 11 exposed therefrom. The polarizing threads 12 of the woven polarizing fabric 1 have their lengthwise direction oriented substantially perpendicular to a horizontal plane and, therefore, the horizontal viewing angle is increased. Also, the front surface D of the woven polarizing fabric 1 where the relatively large portion of the polarizing threads 12 are exposed is oriented so as to confront the viewers 23 so that the woven polarizing fabric 1 can exhibit an enhanced function of a polarizing filter.

8 Claims, 7 Drawing Sheets

Fig. 1(A)
FRONT SURFACE

Fig. 1(B)
REAR SURFACE

POLARIZING SCREEN

BACKGROUND OF THE INVENTION

1. Field of the Invention

The present invention relates to a polarizing screen for use with a video display system equipped with a liquid crystal display device and, more particularly, to the polarizing screen of a type having a polarizing capability of selectively transmitting therethrough or reflecting therefrom the incoming light depending on the direction of polarization.

2. Description of the Prior Art

In general, the liquid crystal video display system, that is, the video display system utilizing a liquid crystal display device, has the following advantages as compared with the CRT video display system utilizing a cathode ray tube.

(1) Due to the compact feature, the liquid crystal video display system can be installed at a relatively small space.

(2) Due to the light-weight feature, the liquid crystal video display system can be transported from place to place easily.

(3) Due to the digital images, the image processing is carried out favorably.

However, the conventional liquid crystal video display system involves an increased amount of loss of light and a low efficiency of utilization of light. This is because rays of light emitted from a source of light is complicatedly processed in the following manner. The rays of white light emitted from the light source made of metal halide is first separated into three light beams of three primary colors by means of a dichroic mirror. The light beams are projected onto a liquid crystal light valve after having been converted into linearly polarized light by means of a linear polarizing element of a light absorbing type. On the other hand, a voltage modulated with a video signal is applied to the liquid crystal light valve to rotate the polarizing plane (the plane of electromagnetic vibration) of the linearly polarized light so that, as the light projected onto the liquid crystal light valve passes therethrough and subsequently pass through an analyzer element (another linear polarizing element), components of rays of light corresponding to the angle of rotation of the polarizing plane are projected onto a screen to thereby form a visible image.

Accordingly, with the prior art screen used in connection with the conventional liquid crystal video display system, the contrast of the projected image is considerably low where the screen is used under the environment with ambient light such as illuminating light considerably reflecting from the screen and, therefore, particularly where the screen of a relatively large size is utilized to present images projected through the liquid crystal video display system, viewers are required to view them in a dark room.

In view of the foregoing, the following techniques have been suggested as a means for increasing the contrast of the projected picture on the screen by decreasing the amount of light originating from ambient light such as, for example, an illuminator lamp and, yet, without accompanying a loss of the imagewise rays of light. Specifically, U.S. Pat. No. 2,362,573 discloses the minimization of emission of external rays of light incident upon the screen by the utilization of a laminated structure of a polarizing element and a quarter-wavelength plate; U.S. Pat. No. 2,793,361 discloses a technique in which a source of illuminating light is covered by a polarizing element while the screen is covered by another polarizing element of a type having a plane of electromagnetic vibration of transmissive polarized light lying perpendicular to that of the polarizing element covering the illuminating light source; U.S. Pat. No. 3,319,519 discloses a technique in which a source of imagewise rays of light is covered by a polarizing element while the screen is covered by another polarizing element of a type having a plane of electromagnetic vibration of transmissive polarized light matching with that of the polarizing element covering the source of imagewise rays of light; and the Japanese Laid-open Patent Publication No. 50-98831 discloses a technique in which, not only are a source of imagewise rays of light and a screen covered, respectively, by a first polarizing element and a second polarizing element of a type having a plane of electromagnetic vibration of transmissive polarized light matching with each other, but also a source of illuminating light is covered by a third polarizing element having a plane of electromagnetic vibration of transmissive polarized light matching with that of any one of the first and second polarizing element.

Other references of interest include the Japanese Laid-open Patent Publication No. 51-71697 which discloses the utilization of a liquid crystal video image analyzing element on a surface of the screen; the Japanese Laid-open Patent Publication No. 3-287244 which discloses a technique in which an array of polarizing beam splitters having a plane of electromagnetic vibration of transmissive polarized light matching with linearly polarized light carrying an image as a result of passage through a liquid crystal display device is disposed on a surface of the screen; the Japanese Laid-open Patent Publication No. 4-63333 which discloses a technique in which a polarizing element having a light absorption characteristic adapted to a dispersion of wavelengths of three primary colors formed by respective liquid crystal panels is disposed on a surface of the screen; and the Japanese Laid-open Patent Publication No. 4-29127 which discloses a technique in which an array of minute polarizing elements and minute light absorbent elements alternating with each other is disposed on a surface of the screen.

On the other hand, in order to realize a screen for the presentation of the image, formed by a liquid crystal video projector, in a manner required for one or more viewers to clearly view the projected image, not only is it required to increase the contrast of the projected image, but also the screen should be of a large format size sufficient to provide a large format picture and, at the same time, the screen must be so flexible as to be rolled up for storage or transportation. In view of this, as means for improving overall aspects of the screen to satisfy the various requirements, formation of a screen with the use of a woven polarizing fabric having a function of an array of polarizing lenslets has been developed such as disclosed in, for example, the Japanese Laid-open Patent Publication No. 5-197026 corresponding to U.S. Pat. No. 5,251,065.

It has, however, been found that the polarizing screen utilizing the woven fabric requires some improvements to be done in such a way as to increase the efficiency of utilization of the imagewise rays of light by increasing the efficiency of removal of the illuminating light and, also, by increasing the luminance of the projected image within a predetermined viewing angle.

SUMMARY OF THE INVENTION

Accordingly, the present invention has been sought to substantially eliminate the various problems inherent in the prior art screens and has for its essential object to provide an improved polarizing screen of a type which utilizes a woven polarizing fabric woven in a satin fashion including warps of one of polarizing and non-polarizing threads and wefts of the other of the polarizing and non-polarizing threads, wherefore when the polarizing screen is used with the polarizing threads of the woven polarizing fabric having their lengthwise direction oriented substantially perpendicular to a horizontal plane, the projected imagewise rays of light are diffused at an approximately constant intensity as widely as possible in the horizontal plane to provide an increased horizontal viewing angle is obtained so that the polarizing screen can provide a high contrast of the projected image and an increased efficiency of utilization of the imagewise rays of light, permitting a group of viewers, lined up along a widthwise direction of the polarizing screen, to clearly view the projected image formed by the liquid crystal display device.

To this end, the present invention according to one aspect thereof provides a polarizing screen which comprises a woven polarizing fabric having front and rear surfaces opposite to each other and woven in a satin fashion including warps of one of polarizing and non-polarizing threads and wefts of the other of the polarizing and non-polarizing threads. The front surface of the woven polarizing fabric has a relatively large portion of the polarizing threads being exposed therefrom while the rear surface thereof has a relatively large portion of the non-polarizing threads exposed therefrom. The polarizing threads of the woven polarizing fabric have their lengthwise direction oriented substantially perpendicular to a horizontal plane.

In the polarizing screen of the construction described hereinabove, the polarizing threads forming part of the polarizing screen employing the woven polarizing fabric in which the density of the polarizing threads woven in a satin fashion is increased has a cross-sectional shape similar to a minute round or oval shape while the polarizing threads corrugate gently in a direction lengthwise thereof. Because of this feature, rays of light incident upon the polarizing threads are easier to emit in a wide angle within the cross-section of each polarizing thread than in a plane of the lengthwise direction of the polarizing threads. Accordingly, when the screen is set up with the lengthwise direction of the polarizing threads forming the woven polarizing fabric oriented perpendicular to the horizontal plane, the angle of view of the projected image in a vertical direction becomes relatively small while the angle of view of the projected image in a horizontal direction increases considerably. Also, since the polarizing threads are woven as warps or wefts in a satin fashion so that the surface of the woven polarizing fabric where a relatively large portion of the polarizing threads is exposed so as to be viewed by the viewers, the woven polarizing fabric exhibits a highly effective filtering function to suppress reflection of ambient light such as originating from an illuminator lamp.

By the reasons stated above, rays of light entering through a window in a wall defining a viewing room and impinging substantially at right angles upon the polarizing screen can be effectively removed. It is to be noted that, under a standard condition in which imagewise rays of light are projected, the angle of incidence of the ambient light originating from, for example, an illuminator lamp onto the screen is in most cases smaller than the Brewster polarization angle (for example, the angle of polarization of a reflective surface having a refractive index of 1.52 is 50°40') and, therefore, any possible objections resulting from the ambient light can be negligible in practice.

The polarizing screen of the present invention can be used as a transmissive-type polarizing screen if the woven polarizing fabric is designed so as to have a front surface adapted to be viewed by the viewers and a rear surface opposite to the front surface and adapted to form an incident surface onto which the imagewise rays of light are projected.

On the other hand, the polarizing screen of the present invention can be used as a reflective-type polarizing screen if the front surface of the woven polarizing fabric is used as the incident surface onto which the imagewise rays of light are projected while the rear surface thereof is deposited with, or covered in any suitable manner by, a metallic reflecting layer. With the reflective-type polarizing screen, a surface reflection of the ambient light can be suppressed.

According to a preferred embodiment of the present invention herein disclosed, the polarizing screen is of a structure wherein the woven polarizing fabric has its front and rear surfaces covered by a transparent resinous layer. In this structure, since the transparent resinous layer fills up interstices defined among threads woven to form such polarizing fabric, both of the viewing angle and the recurrence can be improved. Also, since the woven polarizing fabric is protected by the transparent resinous layer, it is possible not only to smooth the thread surface, but also to avoid generation of dusts from the threads during the manufacture of the screen, to increase the luminance, to avoid oxidization of the metallic light reflecting layer (i.e., to increase the durability of the metallic light reflecting layer), and to stabilize the dimension of the woven polarizing fabric.

According to another preferred embodiment of the present invention, each of the polarizing threads has such a cross-sectional shape that a front portion thereof adjacent the front surface of the polarizing screen that is adapted to be viewed by the viewers is generally flattened while the remaining portion thereof remote from the front surface of the polarizing screen represents a generally oval shape. With this feature, both of optimization of the viewing angle and uniformity of the luminance within the predetermined viewing angle can be accomplished simultaneously.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which.

DETAILED DESCRIPTION OF THE EMBODIMENTS

Preferred embodiments of the present invention will now be described with reference to the accompanying drawings.

Figure 5:
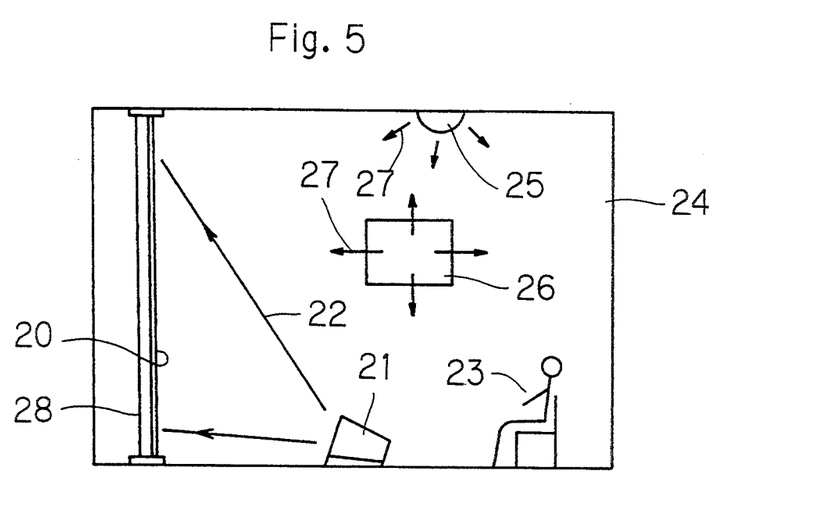
FIG. 5 is a schematic side view of, for example, a house room showing how the polarizing screen of the reflective type according to the present invention is utilized.

Referring first to FIG. 5 illustrating the environment in which a screen of a reflective type according to the present invention is utilized in, for example, a house room 24. As shown therein, a liquid crystal video projector 21 of any known construction utilizing a liquid crystal light valve (a liquid crystal display device) is installed in front of a reflective-type polarizing screen 20 of the present invention and generally intermediate between the polarizing screen 20 and a viewer 23. Imagewise rays of light 22 projected by the liquid crystal video projector 21 are projected onto the reflective-type polarizing screen 20 to present a projected picture. The viewer 23 occupying a seat on one side of the liquid crystal video projector 21 opposite to the reflective-type polarizing screen 20 can enjoy viewing the picture so projected onto the reflective-type polarizing screen 20. The house room 24 may not be dark and it is not unusual that the house room 24 is illuminated by ambient rays of light 27 originating not only from an illuminator lamp 25, but also through a window 26. The reflective-type polarizing screen 20 within the house room 24 is shown as supported by a screen support base 28 disposed rearwardly of the reflective-type polarizing screen 20.

Figure 1A:
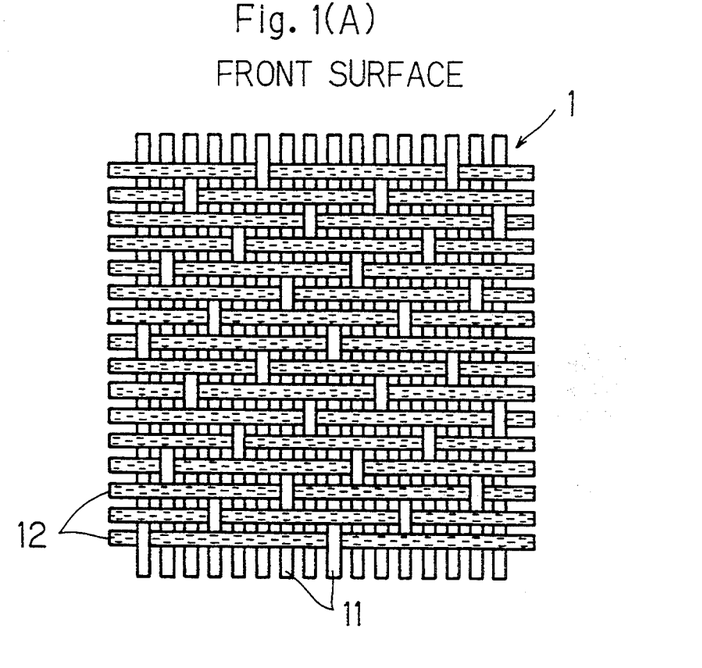
FIG. 1(A) is a plan view of a portion of a front surface of a woven polarizing fabric forming a part of a polarizing screen of the present invention.
Figure 1B:
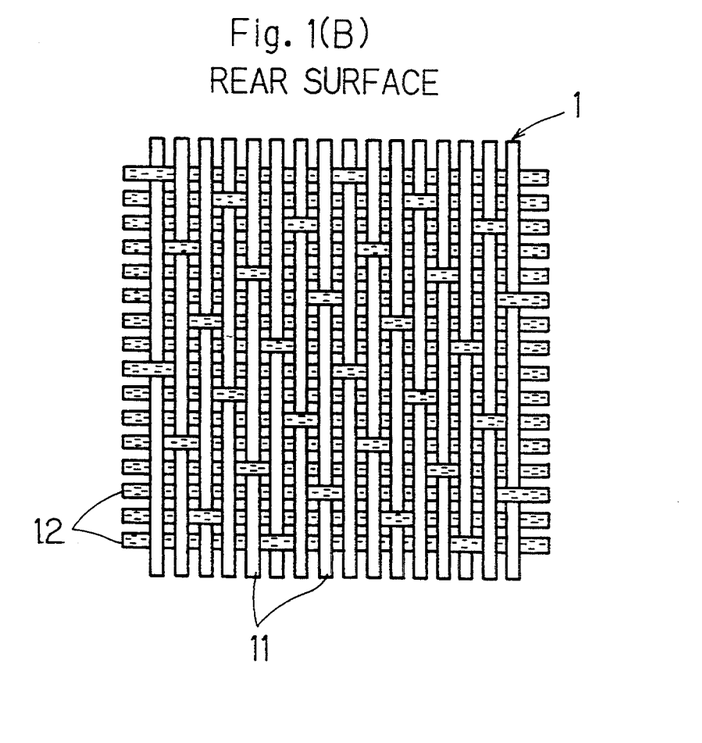
FIG. 1(B) is a plan view of a portion of a rear surface of the woven polarizing fabric forming a part of the polarizing screen shown in FIG. 1(A)

The reflective-type polarizing screen 20 referred to above is in the form of a generally oblong piece of woven polarizing fabric 1 shown in FIGS. 1(A) and 1(B). The woven polarizing fabric 1 shown therein comprises warps of transparent non-polarizing threads 11 made of, for example, 6-Nylon and having, for example, 30 deniers, and wefts of polarizing thread 12 made of, for example, spun fibers of poly(vinyl alcohol), which have been added with 0.10% of dichroic dyes and stretched, and having 90 deniers. The number or density of the transparent non-polarizing threads 11 employed as the warps per inch is preferably 95 while that of the polarizing thread 12 employed as the wefts per inch is preferably 220. This woven polarizing fabric 1 is woven according to a satin elastic webbing method so as to have a web width of 1,760 min. Specifically, by this satin elastic webbing method. The woven polarizing fabric 1 is given a satin finish in which, as shown in FIG. 1(A). Each polarizing thread 12 extending widthwise of a web of woven polarizing fabric 1 passes underneath the transparent non-polarizing thread 11 at intervals of every eight transparent non-polarizing threads 11 in the widthwise direction of the web while each transparent non-polarizing thread 11 extending lengthwise of the web of woven polarizing fabric 1 passes over the polarizing thread 12 at intervals of every eight polarizing threads 12 in the lengthwise direction of the web with neighboring pass-over points in each of the widthwise and lengthwise directions shifted by three polarizing threads 12 and three nonpolarizing threads 11.

By the utilization of the polarizing fabric 1 so manufactured having a high density of the polarizing thread 12, any possible reduction in image quality resulting from leakage of light through interstices among the threads can be advantageously eliminated, accompanied by an increase of the quality of the picture displayed by the reflective-type polarizing screen 20.

Figure 2A:
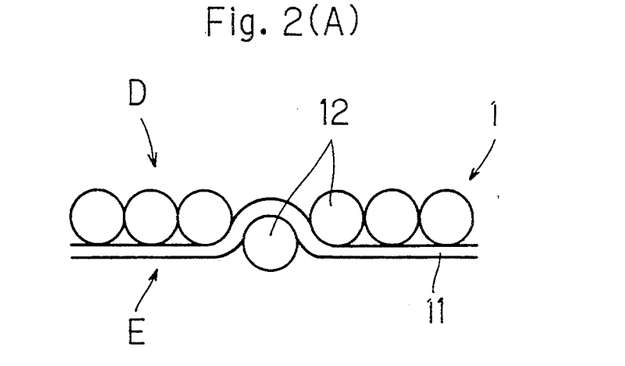
FIG. 2(A) is a schematic transverse sectional view of the woven polarizing fabric forming a part of the polarizing screen of the present invention, showing an intersecting portion of the woven polarizing fabric where a polarizing fiber intersects a non-polarizing fiber as viewed in a direction perpendicular to the lengthwise direction of the polarizing fiber.
Figure 2B:
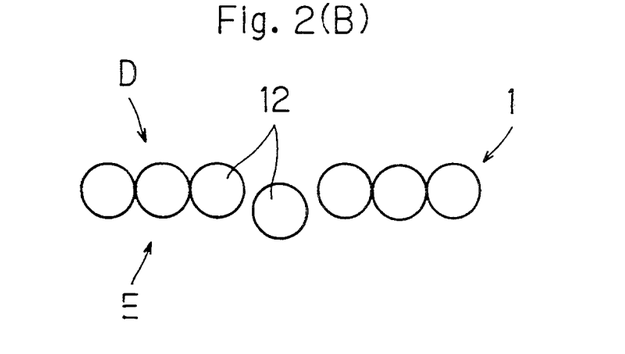
FIG. 2(B) is a schematic transverse sectional view of the woven polarizing fabric forming a part of the polarizing screen of the present invention, showing a non-intersecting portion of the woven polarizing fabric shown in FIG. (A)
Figure 2C:
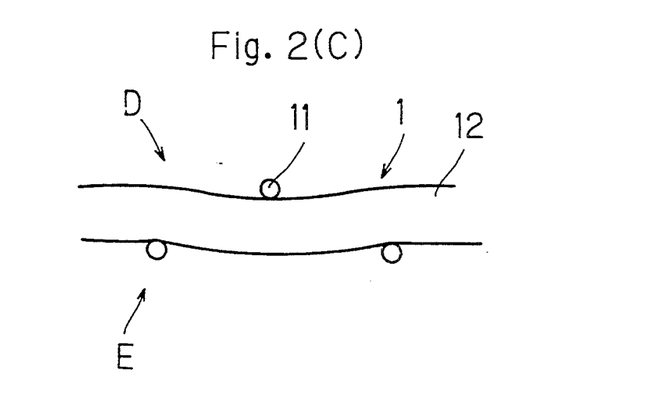
FIG. 2(C) is a schematic sectional view of the woven polarizing fabric taken in a direction parallel to the lengthwise direction of the polarizing fiber forming the woven polarizing fabric shown in FIG. 2(A)

The cross-sectional structure of the woven polarizing fabric 1 is best shown in FIG. 2 wherein FIG. 2(A) shows an intersecting portion of the woven polarizing fabric 1 where one of the polarizing threads intersects one of the nonpolarizing threads as viewed in a direction perpendicular to the lengthwise direction of the polarizing fibers; FIG. 2(B) shows a non-intersecting portion of the woven polarizing fabric; FIG. 2(C) shows a cross-section taken along the polarizing thread 11. The woven polarizing fabric 1 shown therein has an upper surface serving as a front surface D from which a relatively large amount of the polarizing threads 12 is exposed to the outside, and also has a lower surface serving as a rear surface E from which a relatively large amount of the transparent nonpolarizing threads 11 is exposed to the outside. Both of the polarizing thread 12 and the transparent non-polarizing threads 11 forming the woven polarizing fabric 1 have not yet been calendered and, therefore, represent a round cross-sectional shape taken in a direction transverse to the lengthwise direction of each thread.

Figure 3A:
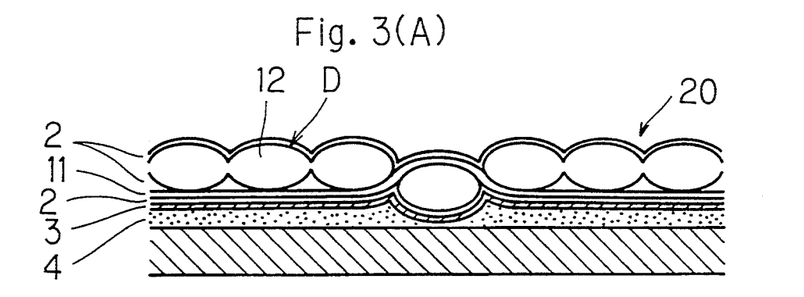
FIG. 3(A) is a schematic transverse sectional view of the woven polarizing fabric forming a part of the polarizing screen of a reflective type according to a first preferred embodiment of the present invention, showing an intersecting portion of the woven polarizing fabric where a polarizing fiber intersects a non-polarizing fiber as viewed in a direction perpendicular to the lengthwise direction of the polarizing fiber.
Figure 3B:
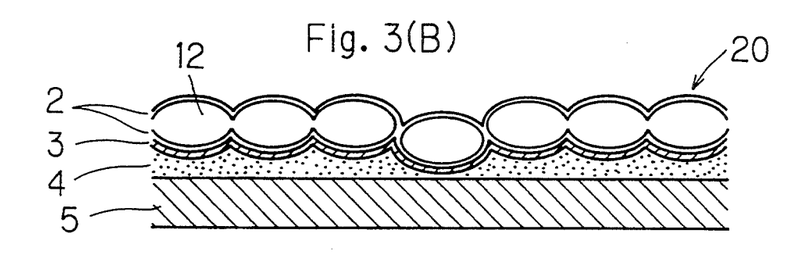
FIG. 3(B) is a schematic transverse sectional view of the woven polarizing fabric forming a part of the polarizing screen of the present invention, showing a non-intersecting portion of the woven polarizing fabric shown in FIG. 3(A)
Figure 3C:
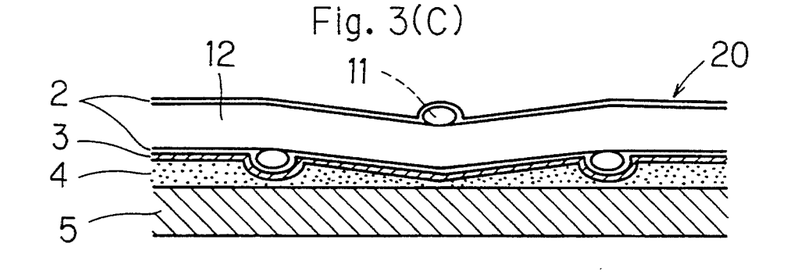
FIG. 3(C) is a schematic sectional view of the woven polarizing fabric taken in a direction parallel to the lengthwise direction of the polarizing fiber forming the woven polarizing fabric shown in FIG. 3(A)

According to a first preferred embodiment of the present invention, a calendering process using a heated metal roll and a rubber roll is applied to the front surface D of the woven polarizing fabric 1 to render the polarizing threads 12 to represent a generally oval cross-sectional shape as shown in FIGS. 3(A) to 3(C). In this way, a pattern of distribution of luminance of light reflected from the reflective-type polarizing screen 20 having the woven polarizing fabric 1 is rendered to be so proper that the luminance can be made uniform within a predetermined viewing angle.

After the calendering process, a transparent resin such as poly(urethane) or acrylic resin is applied in a quantity of about 15 g/m² to both of the front and rear surfaces of the woven polarizing fabric 1 to form a transparent resin coated layer 2 on the front and rear surfaces D and E of the woven polarizing fabric 1. Poly(urethane) is preferred for the coating resin because of its excellent elasticity and optical property. Formation of the transparent resin coated layer 2 on each of the front and rear surfaces D and E of the woven polarizing fabric 1 in the manner described above results in the interstices among the non-polarizing and polarizing threads 11 and 12 having been filled up by the transparent resin so that the resultant reflective-type polarizing screen 20 can have an increased viewing angle and an increased recurrence. In addition, formation of the transparent resin coated layer 2 on each of the front and rear surfaces D and E of the woven polarizing fabric 1 is also advantageous in that, during the manufacture of the reflective-type polarizing screen 20, generation of dusts is minimized; in that minute surface irregularities formed on the polarizing thread 12 are smoothed out to increase the luminance; in that any possible deformation of the woven polarizing fabric 1 which would occur as a result of moisture absorption is minimized to secure a flatness of the reflective-type polarizing screen 20; and in that the durability of the woven polarizing fabric 1 can be increased.

After the formation of the transparent resin coated layer 2 on each of the surfaces D and E of the woven polarizing fabric 1, the transparent resin coated layer 2 on the rear surface E of the woven polarizing fabric 1 is covered by a metallic light reflecting layer 3. The metallic light reflecting layer 3 referred to above is formed by vapor-depositing aluminum on an outer surface of the transparent resin coated layer 2 on the rear surface E of the woven polarizing fabric 1 to a thickness of about 1,000 angstroms. Oxidization of this metallic light reflecting layer 3 in contact with air is prevented by the transparent resin coated layer 2. In addition, the use of a flexible aluminum-deposited film for the metallic light reflecting layer 3 is effective to allow the reflective-type polarizing screen 20 to be rolled up. Thereafter, a reinforcement sheet 5 of, for example, 0.30 mm in thickness made of a soft resin of poly(vinyl chloride) is pasted to an outer surface of the metallic light reflecting layer 3 opposite to the transparent resin coated layer 2 by the use of a suitable bonding agent 4, thereby to complete the reflective-type polarizing screen 20.

When the reflective-type polarizing screen 20 of the present invention is in use, the reflective-type polarizing screen 20 is supported as shown in FIG. 5 by the screen support base 28 with the polarizing threads 12 of the woven polarizing fabric 1 extending generally vertically relative to a horizontal plane parallel to a floor while the front surface D of the reflective-type polarizing screen 20 confronts the viewer 23.

With the reflective-type polarizing screen 20 according to the illustrated embodiment of the present invention, the imagewise rays of light 22 projected by the liquid crystal video projector 21 and having its direction of polarization (the plane of electromagnetic vibration) lying perpendicular to the lengthwise direction of the polarizing thread 12 and most of the ambient rays of light 27 enters the transparent non-polarizing threads 11 after having passed through portions of the polarizing threads 12 exposed towards the viewer 23 and only a component of the ambient rays of light 27 of which direction of polarization (the plane of electromagnetic vibration) lies in the same direction as the lengthwise direction of the polarizing threads 12 are absorbed by the polarizing threads 12. Therefore, surface reflection of the ambient rays of light 27 can be effectively suppressed. This surface reflection of the ambient rays of light 27 can further be advantageously suppressed if one or both of the illuminator lamp 25 and the window 26 are covered by a polarizing element of which plane of electromagnetic vibration of light passing therethrough lies perpendicular to that of the reflective-type polarizing screen 20. Examples of this polarizing element which may be advantageously employed for covering one or both of the illuminator lamp 25 and the window 26 includes, for example, a polarizing curtain, a polarizing blind or a polarizing louver, all of which may be made of the woven polarizing fabric 1 employed in the practice of the present invention.

Figure 4:
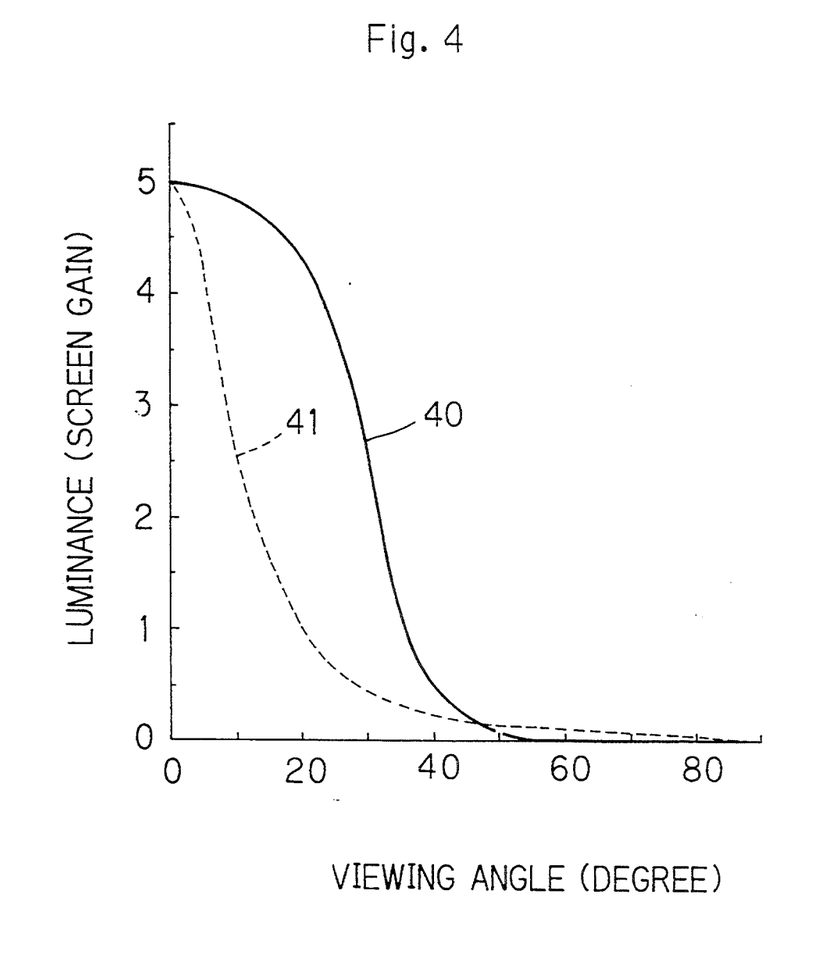
FIG. 4 is a graph showing a pattern of distribution of luminance exhibited by the polarizing screen of a reflective type according to the first preferred embodiment of the present invention, which screen is utilized in association with imagewise rays of light comprised of linearly polarized light whose plane of electromagnetic waves lies horizontally.

A result of measurement of luminance of the reflective-type polarizing screen 20 exhibited when the imagewise rays of light 22 composed of linearly polarized light having its plane of electromagnetic vibration lying in a horizontal plane is shown in FIG. 4. As shown in the graph of FIG. 4, it has been found that the half value of the horizontal viewing angle 40 is considerably greater than the half value of the vertical viewing angle 41. Also, the luminance exhibited by the reflective-type polarizing screen 20 when the imagewise rays of light 22 were projected from the video projector 21 is gently distributed within the horizontal viewing angle, but steeply decreases in an area outside the horizontal viewing angle. Thus, it will readily be seen that the reflective-type polarizing screen 20 of the present invention exhibits a high efficiency of utilization of the imagewise rays of light 22 projected thereonto from the video projector 21.

With respect to material, a transparency to visible rays of light is an essential element and, in particular, the warps (i.e., the transparent non-polarizing threads 11) must have a strength sufficient to allow the transparent non-polarizing threads 11 to be utilized as the warps and the wefts (i.e., the polarizing threads 12) must have a flexibility sufficient to allow the polarizing threads 12 to be densely woven together with the warps, that is, the transparent non-polarizing threads 11. So long as the material satisfies these requirements, the material may not be limited and, in addition to the 6-Nylon referred to previously, any of fibers of 6,6-Nylon, a copolymer of ethylene-vinyl alcohol, cellulose, poly(ethylene terephthalate), poly(butylene terephthalate) or the like may be employed for the material. It is to be noted that the polarizing threads 12 is preferred to have a degree of polarization of 70% or higher in the presence of a high dispersion of the dichroic dyes.

Figure 6:
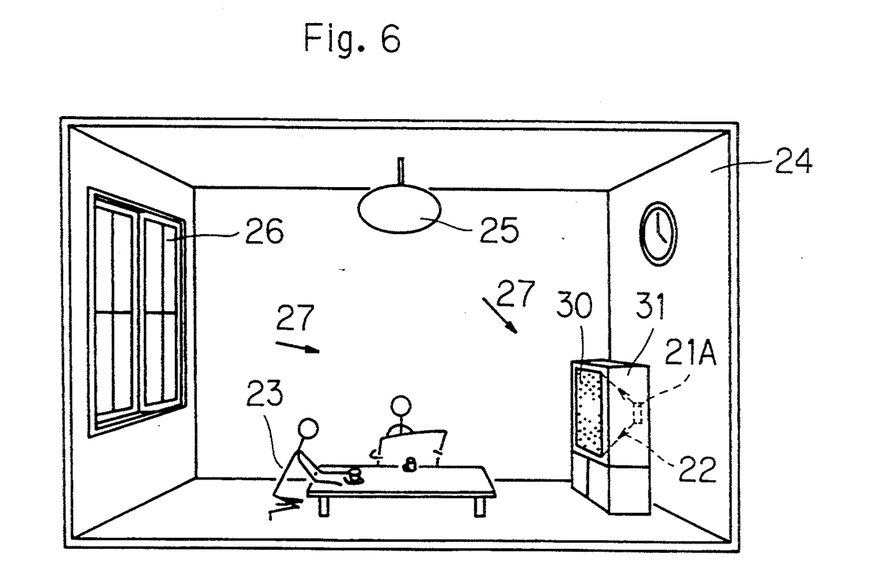
FIG. 6 is a schematic side view of, for example, a house room showing how the polarizing screen of a transmissive type according to the present invention is utilized.

It is to be noted that if during the manufacture of the reflective-type polarizing screen 20 according to the foregoing embodiment of the present invention, process steps of and subsequent to the formation of the metallic light reflecting layer for reflecting the visible rays of light are omitted, a transmissive-type polarizing screen 30 can be obtained. This transmissive-type polarizing screen 30 is shown in FIG. 6 and is set up within the house room 24. So far shown in FIG. 6, the transmissive-type polarizing screen 30 is utilized as a display screen of a liquid crystal video display device 31 of a rear projection type. In this video display system, since the optical path from the liquid crystal light valve 21A to the screen 30 is relatively short, a Moire pattern may occur on the screen 30 as a result of interference between the pattern of threads forming the woven polarizing fabric 1 and the pattern of picture elements carried by the image-wise rays of light 22. This problem can be minimized by reducing the maximum diameter of the threads to a value smaller than the periodic structure of the picture elements of the image projected onto the screen.

Figure 7A:
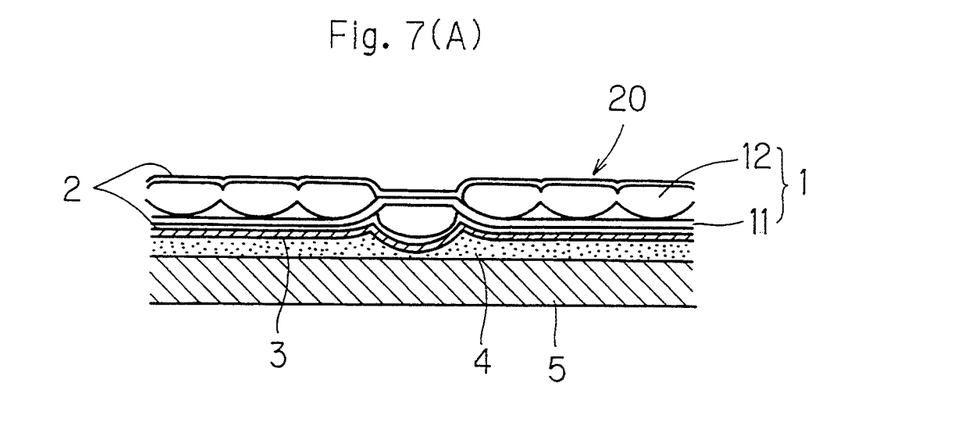
FIG. 7(A) is a schematic transverse sectional view of the woven polarizing fabric forming a part of the polarizing screen of the reflective type according to a second preferred embodiment of the present invention, showing an intersecting portion of the woven polarizing fabric where a polarizing fiber intersects a non-polarizing fiber as viewed in a direction perpendicular to the lengthwise direction of the polarizing fiber.
Figure 7B:
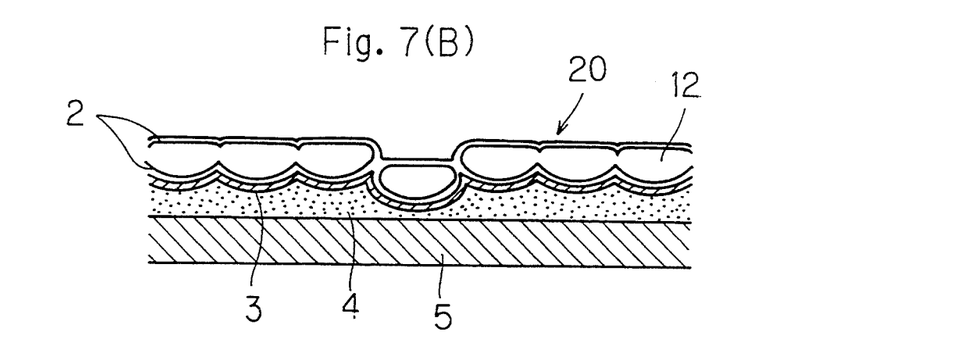
FIG. 7(B) is a schematic transverse sectional view of the woven polarizing fabric forming a part of the polarizing screen of the present invention, showing a non-intersecting portion of the woven polarizing fabric shown in FIG. 7(A)
Figure 7C:
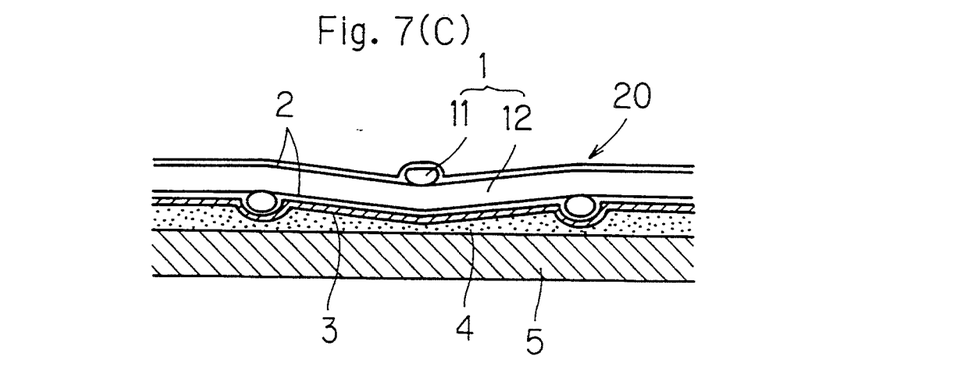
FIG. 7(C) is a schematic sectional view of the woven polarizing fabric taken in a direction parallel to the lengthwise direction of the polarizing fiber forming the woven polarizing fabric shown in FIG. 7(A)

During the manufacture of the reflective-type polarizing screen 20 according to a second preferred embodiment of the present invention, the calendering process should be applied to the front surface D of the woven polarizing fabric 1 so that each of the polarizing threads 12 can assume such a cross-sectional shape that, as shown in FIGS. 7(A) to 7(C), a front portion of each polarizing thread 12 remote from the reinforcement sheet 5 is substantially flattened while a rear portion thereof represents a shape occupying a generally half of the oval shape. More specifically, in this reflective-type polarizing screen according to the second preferred embodiment of the present invention, each polarizing thread 12 is shaped by the calendering process so as to have a cross-sectional shape similar to a plano-convex lens. Because each polarizing thread 12 has a cross-sectional shape similar to a plano-convex lens discussed above, the luminance exhibited by the reflective-type polarizing screen 20 as a whole is rendered to be further uniform while the viewing angle can be increased to an optimum value although the luminance of the projected image may be somewhat high at a zero viewing angle, that is, a center portion of the reflective-type polarizing screen 20.

For the purpose of testing as will be described later, three types of samples (1), (2) and (3) of screens were prepared.

Sample (1): The woven polarizing fabric 1 as woven, but not calendered, which fabric 1 has a rear surface deposited with the metallic light reflecting layer 3 of aluminum.

Sample (2): The woven polarizing fabric 1 which has been calendered in the manner of the second preferred embodiment, which fabric 1 has a rear surface deposited with the metallic light reflecting layer 3 of aluminum.

Sample (3): The woven polarizing fabric 1 having the transparent resin coated layer 2 coated subsequent to the calendering process of the second embodiment and also having the metallic light reflecting layer 3 of aluminum deposited on a front surface thereof.

Those samples (1) to (3) were equally tested as to the test items, Tests A to H, and also as to the durability.

Test A: Saline Drop Test 1 cc of 5% saline was dropped onto each sample and then allowed to stand for one hour, followed by flushing with water. After drying for 24 hours at room temperatures, SG was measured.

Test B: Acetic Acid Drop Test 1 cc of an aqueous solution of 5% acetic acid was dropped onto each sample and then allowed to stand for one hour, followed by flushing with water. After drying for 24 hours at room temperatures, SG was measured.

Test C: Neutral Detergent Drop Test 1 cc of an aqueous solution of 1% "Mama Lemon" (registered trademark) detergent was dropped onto each sample and then allowed to stand for one hour, followed by flushing with water. After drying 24 hours at room temperature, SG was measured.

Test D: Alkaline Drop Test 1 cc of an aqueous solution of 1% sodium carbonate was dropped onto each sample and then allowed to stand for one hour, followed by flushing with water. After drying 24 hours at room temperature, SG was measured.

Test E: Alcohol Drop Test 1 cc of an aqueous solution of 90% methanol was dropped onto each sample and then allowed to stand for one hour, followed by flushing with water. After drying 24 hours at room temperature, SG was measured.

Test F: Thermo-Hygrostat Test

SG was measured after each sample had been dried at a temperature of 40° C. and a relative humidity of 90% for 120 hours.

Test G: Oil-Resistant Test

A vegetable oil was applied to each sample, followed by drying at a temperature of 40° C. and a relative humidity of 90% for 120 hours, and then SG was measured.

Test H: Water-Resistant Test

Each sample was immersed in a pure water bath at normal temperatures for 24 hours and dried. SG was measured subsequently.

The durability test was conducted on each of the samples (1) to (3) by measuring the screen gain SG using the following equation (I).

$$SG = \pi] \text{Luminance (lux)/Illuminance } (cd/m^2) \qquad (I)$$

The durability of each sample tested was evaluated in terms of SG retentivity expressed by the following equation (II).

$$\text{SG Retentivity (\%)} = 100 \times \text{Post-test SG/Reference SG} \qquad \text{(II)}$$

It is to be noted that, in the equation (II), the post-test SG and reference character SG represent the screen gains SG obtained after and before the durability test, respectively.

Results of the various tests A to H conducted are tabulated in the following table. As the table makes it clear, the sample screens having no transparent resin coated layer 2 were susceptible to reduction in SG retentivity as a result of oxidization of the metallic light reflecting layer 3 in contact with the drops of the solutions whereas the sample screens having the transparent resin coated layer 2 did not give rise to substantial reduction in SG retentivity. This accounts that the employment of the transparent resin coated layer 2 on both surfaces of the woven polarizing fabric 1 is effective to increase the durability of the polarizing screen of the present invention. It is also to be noted that, as compared with the samples having no transparent resin coated layer 2, visual inspection of the samples having the transparent resin coated layer 2 have shown that no considerable change was observed.

TABLE

| Test Items | SG Retentivity (%) | | Visual Inspection | |
|---|---|---|---|---|
| | Without Layer 2 | With Layer 2 | Without Layer 2 | With Layer 2 |
| Test A | 77.4 | 100.0 | No change | No change |
| Test B | 78.8 | 100.0 | Color changed | No change |
| Test C | 82.2 | 100.0 | Color changed | No change |
| Test D | 66.4 | 100.0 | Color changed | No change |
| Test E | 84.9 | 100.0 | No change | No change |
| Test F | 46.3 | 100.0 | Color changed | No change |
| Test G | 54.4 | 100.0 | No change | No change |
| Test H | 65.8 | 100.0 | Color changed | No change |

Figure 8:
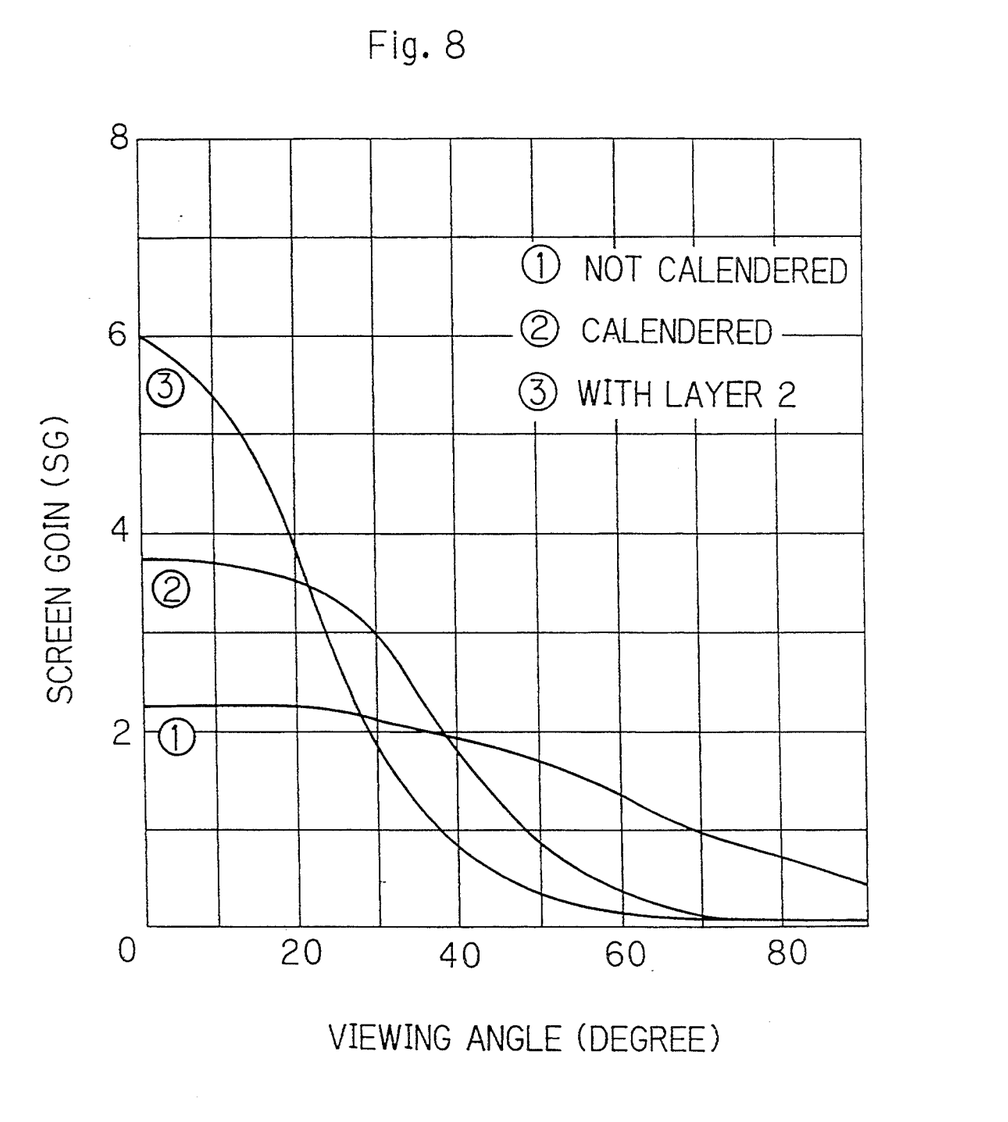
FIG. 8 is a graph showing a pattern of distribution of luminance of the projected imagewise light exhibited by the polarizing screen according to the second preferred embodiment of the present invention.

FIG. 8 illustrates a pattern of distribution of luminance of the polarizing screen of the present invention, wherein the axis of ordinates represents the screen gain SG and the axis of abscissas represents the viewing angle. In this graph of FIG. 8, a curve (1) represents the relationship between the screen gain SG and the viewing angle exhibited by the woven polarizing fabric 1 as woven, but not calendered, which fabric 1 has a rear surface deposited with the metallic light reflecting layer 3 of aluminum (Sample (1)); a curve (2) represents the relationship between the screen gain SG and the viewing angle exhibited by the woven polarizing fabric 1 which has been calendered as shown in FIGS. 7(A) to 7(C), which fabric 1 has a rear surface E deposited with the metallic light reflecting layer 3 of aluminum (Sample (2)); and a curve (3) represents the relationship between the screen gain SG and the viewing angle exhibited by the woven polarizing fabric 1 having the transparent resin coated layer 2 coated subsequent to the calendering process and also having the metallic light reflecting layer 3 of aluminum deposited on the rear surface E thereof (Sample (3)).

As compared with the woven polarizing fabric 1 as woven, but not calendered, which fabric 1 has a rear surface E deposited with the metallic light reflecting layer 3 of aluminum (as shown by the curve (1)), the woven polarizing fabric 1 which has been calendered, which fabric 1 has a rear surface E deposited with the metallic light reflecting layer 3 of aluminum (as shown by the curve (2)) exhibits a relatively high screen gain SG within a predetermined viewing angle of 0 to 30 degrees, but decreasing considerably in an area outside the predetermined viewing angle. On the other hand, the woven polarizing fabric 1 having the transparent resin coated layer 2 coated subsequent to the calendering process and also having the metallic light reflecting layer 3 of aluminum deposited on a rear surface E thereof (as shown by the curve (3)) has shown a screen gain SG which is increased within the predetermined viewing angle of 0 to 30 degrees and this is because the interstices among the threads used to form the woven polarizing fabric 1 are filled up with the transparent resin coated layer 2. Thus, it is clear that the use of the calendering process and the transparent resin coated layer 2 during the manufacture of the polarizing screen of the present invention is particularly advantageous in that the efficiency of utilization of the imagewise rays of light projected onto the polarizing screen can be increased.

It is to be noted that, in the practice of the second preferred embodiment of the present invention, the polarizing threads 12 forming the part of the woven polarizing fabric 1 may be oriented with their lengthwise direction lying either perpendicular to the horizontal plane or substantially parallel to the horizontal plane. Even though the polarizing threads 12 are oriented with their lengthwise direction lying substantially parallel to the horizontal plane, shaping each polarizing thread 12 so as to have a cross-sectional shape similar to the plano-convex lens results in further uniform orientation of the luminance over the entire surface area of the polarizing screen.

The present invention has been described in connection with the preferred embodiments thereof with reference to the accompanying drawings. It is, however, to be noted that various changes and modifications are apparent to those skilled in the art within the framework of disclosure made herein and, therefore, such changes and modifications are to be understood as included within the scope of the present invention as defined by the appended claims, unless they depart therefore.

What is claimed is:

1. A polarizing screen which comprises:
   a woven polarizing fabric having front and rear surfaces opposite to each other, said woven polarizing fabric being woven in a satin fashion including warps of one of polarizing and non-polarizing threads and wefts of the other of the polarizing and non-polarizing threads, said front surface of the woven polarizing fabric having a relatively large portion of the polarizing threads being exposed therefrom and said rear surface thereof having a relatively large portion of the non-polarizing threads exposed therefrom;
   said polarizing threads of the woven polarizing fabric have their lengthwise direction oriented substantially perpendicular to a horizontal plane.

2. The polarizing screen as claimed in claim 1, which is used as a transmissive-type polarizing screen and wherein the rear surface of the woven polarizing fabric opposite to the front surface adapted to confront a viewer is adapted to receive imagewise rays of light.

3. The polarizing screen as claimed in claim 1, which is used as a reflective-type polarizing screen and wherein the front surface of the woven polarizing fabric adapted to confront a viewer is adapted to receive imagewise rays of light and the rear surface is deposited with a metallic reflecting layer.

4. The polarizing screen as claimed 1, further comprising a transparent resin layer formed on each of the front and rear surfaces of the woven polarizing fabric.

5. A polarizing screen which comprises:

a woven polarizing fabric having front and rear surfaces opposite to each other, said woven polarizing fabric including a plurality of juxtaposed polarizing threads and a plurality of juxtaposed non-polarizing threads extending substantially perpendicular to the juxtaposed polarizing threads, each of said polarizing threads having a cross-sectional shape as viewed in a direction perpendicular to a lengthwise direction of each polarizing thread, said cross-sectional shape comprising a generally flattened front portion thereof defining the front surface of the woven polarizing fabric anti a generally oval rear portion opposite to said flattened front portion; and a metallic light reflecting layer formed on the rear surface of the woven polarizing fabric.

6. The polarizing screen as claimed in claim 5, wherein said polarizing threads of the woven polarizing fabric have their lengthwise direction oriented substantially perpendicular to a horizontal plane.

7. The polarizing screen as claimed in claim 5, wherein said woven polarizing fabric is woven in a satin fashion including warps of one of the polarizing and non-polarizing threads and wefts of the other of the polarizing and non-polarizing threads, said front surface of the woven polarizing fabric having a relatively large portion of the polarizing threads being exposed therefrom and said rear surface thereof having a relatively large portion of the non-polarizing threads exposed therefrom.

8. The polarizing screen as claimed in claim 5, further comprising a transparent resin layer formed on each of the front and rear surfaces of the woven polarizing fabric.

* * * * *